United States Patent
Simon

(10) Patent No.: US 8,751,157 B2
(45) Date of Patent: Jun. 10, 2014

(54) METHOD AND DEVICE FOR DETERMINING THE POSITION OF A VEHICLE ON A CARRIAGEWAY AND MOTOR VEHICLE HAVING SUCH A DEVICE

(75) Inventor: Christina Simon, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/814,860

(22) PCT Filed: Jul. 16, 2011

(86) PCT No.: PCT/EP2011/003558
§ 371 (c)(1),
(2), (4) Date: Feb. 7, 2013

(87) PCT Pub. No.: WO2012/019691
PCT Pub. Date: Feb. 16, 2012

(65) Prior Publication Data
US 2014/0088862 A1      Mar. 27, 2014

(30) Foreign Application Priority Data
Aug. 7, 2010   (DE) .................. 10 2010 033 729

(51) Int. Cl.
*G01C 21/26*   (2006.01)

(52) U.S. Cl.
USPC ................... 701/431; 701/301; 340/435

(58) Field of Classification Search
USPC ............ 701/431, 301, 117; 340/901, 435
See application file for complete search history.

(56) References Cited

U.S. PATENT DOCUMENTS

| | | | |
|---|---|---|---|
| 6,385,536 B2 * | 5/2002 | Kimura | 701/446 |
| 6,888,622 B2 * | 5/2005 | Shimomura | 356/4.01 |
| 7,136,750 B2 * | 11/2006 | Takahama et al. | 701/408 |
| 2008/0077322 A1 | 3/2008 | Sumizawa | |
| 2010/0121569 A1 | 5/2010 | Nakamura et al. | |

FOREIGN PATENT DOCUMENTS

| | | |
|---|---|---|
| DE | 103 49 631 | 5/2005 |
| DE | 10 2005 039 103 | 3/2007 |
| DE | 10 2006 040 334 | 3/2008 |
| DE | 10 2008 053 531 | 5/2009 |
| DE | 10 2009 008 959 | 9/2009 |
| DE | 10 2008 021 380 | 11/2009 |
| DE | 10 2010 033 729.3 | 8/2010 |
| JP | 2004-205527 | 7/2004 |
| WO | 2009/098154 | 8/2009 |
| WO | PCT/EP2011/003558 | 7/2011 |

OTHER PUBLICATIONS

International Search Report for PCT/EP2011/003558, mailed on Nov. 11, 2011.
International Preliminary Report on Patentablity (Chapter II).
English language transmittal Letter for the English translation of the International Preliminary Report on Patentability, mailed Feb. 7, 2013, 1 page.

* cited by examiner

*Primary Examiner* — Tan Q Nguyen
(74) *Attorney, Agent, or Firm* — Staas & Halsey LLP

(57) ABSTRACT

A method determines the position of a vehicle on a carriageway, in which method data of a satellite signal sensor, of a digital map, of a line detection sensor and of a vehicle movement dynamic sensor and/or of a surroundings sensor are combined in such a way that the position of the vehicle on the carriageway is determined with at least lane-specific accuracy. In particular, the method can also be used to determine the number of lanes. A device determines the position of the vehicle on a carriageway, and a motor vehicle has such a device.

20 Claims, 3 Drawing Sheets

METHOD AND DEVICE FOR DETERMINING THE POSITION OF A VEHICLE ON A CARRIAGEWAY AND MOTOR VEHICLE HAVING SUCH A DEVICE

CROSS REFERENCE TO RELATED APPLICATIONS

This application is based on and hereby claims priority to International Application No. PCT/EP2011/003558 filed on Jul. 16, 2011 and German Application No. 10 2010 033 729.3 filed on Aug. 7, 2010, the contents of which are hereby incorporated by reference.

BACKGROUND

The invention relates to a method for finding the position of a vehicle on a carriageway and to an apparatus therefor. Furthermore, the invention relates to an automobile having such an apparatus.

Electronic navigation systems assist a vehicle driver in driving his vehicle on a suitable route from a starting location to a destination. In this case, the global position of the vehicle is usually ascertained by a satellite signal sensor, e.g. a GPS (global positioning system) sensor, and presented on a map on a monitor. The vehicle is positioned on the schematically presented road by virtue of the GPS position in combination with suitable map matching methods. The reason is that the precision of the position finding in the vehicle by the satellite navigation is only approximately 20 m, which means that the vehicle position on the carriageway cannot be indicated with lane precision, for example. The number of lanes on the carriageway which are to be expected for the respective position is read from the digital navigation map, for example. For this purpose, the digital map comprises what are known as map attributes, which provide information about junctions, lane markings, road signs, etc. For turn-off maneuvers, it is thus possible to indicate the target lane, for example, to the driver. Besides the map presentation on a monitor, there is usually additionally a voice announcement.

DE 10 2009 008 959 A1 discloses a driver assistance system which combines a wide variety of information in order to assist a driver in vehicle navigation. To this end, satellite signals, vehicle sensor signals, ambient sensor data and traffic telematics information are merged in order to indicate the vehicle position with a higher level of precision. As part of map verification these data are compared with a stored digital map and are used to find the actual vehicle position.

DE 10 2008 053 531 A1 discloses a method for rating data from a digital map, which method is based on dedicated map quality information or measurement data from an ambient sensor system. For the purpose of validating the map material, the number and profile of the lanes is recorded using a camera, for example. In addition, it is possible to detect objects e.g. guardrails, with radar sensors and to use this information for checking the map data.

DE 10 2008 021 380 A1 discloses a method for predicting the profile of a carriageway ahead of a vehicle.

In a carriageway section close to the vehicle, the profile of the carriageway is captured by a camera, with lane markings also being able to be recognized. A position recognition system makes it possible to establish that section of the carriageway on which the vehicle is located, and the driver assistance system then allows lane tracking. For a carriageway section remote from the vehicle, the carriageway profile is additionally extracted from a map, classified and taken into consideration by the driver assistance system.

DE 10 2006 040 334 A1 discloses a method which can be used to sense lane markings. The lane profile is described by using a plurality of sensor and information sources, e.g. GPS data, radar and video signals and digital maps. The motion of vehicles in front can also be captured and used for determining the lane. A mathematical method allows the lane to be reconstructed.

DE 103 49 631 A1 also discloses a driver assistance device which uses lane information. This information is obtained from the trajectory of other vehicles, the profile of carriageway edge boundaries, GPS data and the position of particular objects. In particular, image recording and analysis methods are used.

US 2008/00773322 A1 discloses a navigation apparatus for a vehicle. The navigation apparatus comprises a position finding device for finding the position and the direction of travel of the vehicle. Furthermore, the navigation apparatus comprises a lane recognition device. In addition, a device for carrying out a map matching method is provided.

WO 2009/098154 A1 describes the sensing of at least one object in the environment of a vehicle with a sensor. In this case, the position captured with the sensor is aligned with a satellite navigation system and a digital map.

Finally, JP 2004 205527 A discloses a navigation system for a vehicle which informs the driver of his position in a lane on a carriageway. The navigation system comprises a lane recognition device, a position finding device, a satellite based locating system and a digital map.

SUMMARY

It is one possible object to allow the position of a vehicle on a carriageway to be found with a high level of spatial resolution.

The inventor proposes a method for finding the position of a vehicle, particularly an automobile, on a carriageway. According to the method, the position of the vehicle is found with a first precision by using the outputs from a satellite signal sensor, e.g. a GPS sensor. The satellite signal sensor can evaluate the received satellite signals such that it finds the spatial position of the vehicle with a first spatial resolution. This first precision is not very high and is in the order of magnitude of the carriageway width itself.

In a further step, the position of the vehicle as found with the first precision is used in order to obtain data relating to a first vehicle environment from a digital map. By way of example, such a digital map is provided as a map which comprises at least information about the profile of carriageways, and is provided in the memory of an electronic navigation appliance, for example. In particular, the digital map also comprises what are known as map data attributes. These are intended to be understood to mean information about the number of lanes on a carriageway, curvature values for a carriageway, information about lane markings, etc. In a second step, the position data from the vehicle that are obtained in the first step via the satellite signal are aligned with the data from the digital map. This is accomplished particularly by what are known as map matching methods. In this way, it is possible to find the position of a vehicle relative to the profile of a carriageway. It is possible to stipulate a first vehicle environment for this respective position, and data relating to characteristic elements within this vehicle environment can be obtained. The data related to the first vehicle environment then comprise, by way of example, data relating to the number of lanes at the respective instantaneous position of the vehicle, objects to be expected in the surroundings of the vehicle for the respective position, curves to be expected, etc.

In a third step, data relating to lane markings in a second vehicle environment are obtained with a line recognition sensor. Lane markings are, in particular, lines put onto the carriageway which allow a vehicle driver to keep to a particular prescribed lane while in transit on the carriageway. By way of example, lane markings are carriageway edge markings, broken lines, solid lines, double solid lines, lines of different color and other markings, characters and symbols which are on a carriageway. A lane marking can also be formed by a series of nubs, reflectors, little lights and the like which are mounted on the carriageway. The line recognition sensor is a detector which is capable of capturing at least some possible lane markings on the carriageway under particular conditions and, by way of example, of identifying them by an image recognition method. In particular, the line recognition sensor produces a line model which arranges the recognized lines in order in the environment of the vehicle on the basis of their position, type, curvature and length. In particular, the line recognition sensor may also be designed to sense a carriageway over its entire width.

According to a fourth step, data relating to the proper motion of the vehicle are obtained with a driving dynamics sensor. Such data may comprise, in particular, instantaneous measured values and measured values obtained over a particular period of time. The data relating to the proper motion can characterize the speed, acceleration, yaw rate and lateral acceleration of the vehicle, for example. The driving dynamics sensor is then a speed sensor, an inertia sensor, a gyro sensor or a compass, for example.

Finally, in an additional fifth step or alternatively in the fourth step, data relating to objects in a third vehicle environment are also obtained with an ambient sensor. By way of example, an ambient sensor may be a camera which captures objects in the area ahead of the vehicle and identifies them by an image recognition method. However, the ambient sensor may also be an infrared sensor, ultrasonic sensor, radar sensor etc. The detectable objects are particularly objects which typically appear on or next to a carriageway, e.g. vehicles, road signs, guardrails, buildings, etc. The ambient sensor can arrange the registered objects into particular classes ("own direction", "opposite direction", "right-hand edge development", "left-hand edge development"), for example using their position, speed and direction.

The designations "first vehicle environment", "second vehicle environment" and "third vehicle environment" are intended to be understood to mean different areas and sections of a general vehicle environment, that is to say of the spatial surroundings of the vehicle. All possible intersections or areas of overlap between the first, second and third vehicle environments are conceivable. In particular, the first, second and third vehicle environments may also coincide, however.

In the last step, the carriageway situation is taken as a basis for finding the position of the vehicle with at least lane-specific precision on the carriageway. This finding is accomplished by virtue of both the data relating to the first vehicle environment from the digital map and the data relating to the lane markings in the second vehicle environment being combined together with further previously obtained data. These further data are either the data relating to the proper motion of the vehicle or the data relating to objects in the third vehicle environment or else are both types of data together. The lane-specific precision is particularly greater than the first precision achieved with the satellite signal sensor.

The map matching provides a very coarse position for the vehicle on a carriageway. This position then has data relating to the first vehicle environment available which are likewise stored in the digital map e.g. data relating to the number of lanes at this position. The data relating to the lane markings then make it possible to establish, by way of example, whether the vehicle is in a lane at the edge of the road or in a lane in the center of the road. The two data records allow the relative position of the vehicle within the carriageway to be found with increased precision, that is to say greater spatial resolution.

In order to improve the precision of the position finding further, it is then possible to use data relating to the motion of the vehicle relative to the carriageway, for example. As a result, it is possible to establish a lane change, for example. If such lane changes are tracked over a relatively long time, it is possible to comprehend which lane the vehicle is currently in. Alternatively or in addition, it is also possible to use the data relating to objects in the third vehicle environment for the more precise position finding. For example, the detection of other vehicles allows inference of a characteristic lane for these vehicles, which in turn allows conclusions regarding the profile of the lanes on a carriageway.

In particular, an environment model is created for each incoming type of data (data from the digital map, data relating to lane markings, data relating to proper motion, data relating to objects) separately. The data from the digital map provide the basis for the algorithm. Next, redundant, additional and complementary data relating to lane markings are also used and are processed with the data from the digital map. The data obtained in this manner are then in turn combined with the data relating to the proper motion of the vehicle and/or the data relating to objects. Using the three environment models, it is thus possible to determine and check the plausibility of the lane in which the vehicle is currently travelling by merging and interpretation.

The method thus combines the data provided by a satellite signal sensor, a digital map, a line recognition sensor, a driving dynamics sensor and an ambient sensor in a skilled manner so as thereby to ascertain the position of the vehicle on the carriageway with at least lane-specific precision. This combination is accomplished particularly by starting from the satellite signal data and the digital map and progressively also taking account of further instances of the aforementioned data records and thereby finding the vehicle position with increasing spatial resolution.

The use and combination of data allows a vehicle driver to be provided with more exact and more detailed information. The driving instructions which are output by a navigation system can thus be made more precise. By way of example, the vehicle driver is provided in good time with a piece of information about whether he is in a lane for travelling straight on or in a turn-off lane. By way of example, it is also possible to output warnings when the driver is in a lane for oncoming traffic.

The method also involves determining the number of lanes, the number of lanes is determined on the carriageway. By way of example, this is possible when data relating to the proper motion of the vehicle are combined with the data from the digital map and the data relating to the lane markings. If a very large number of lane changes take place within a short period of time, for example, detection of the proper motion can be used to draw conclusions about the number of lanes present. If the line recognition sensor is capable of sensing the entire carriageway, for example, then it is possible to draw conclusions about the total number of lanes. Besides the exact position of his vehicle on the carriageway, the vehicle driver also learns the total number of lanes present. The detected objects can also be used to determine the number of lanes. Even more detailed instructions can be output to the driver, which means that he is better able to assess the general traffic situation.

It is particularly preferred in this case if the information about the number of lanes is used to correct data in the digital map. The data relating to a number of lanes which are stored in a digital map may be outdated and may not correctly reproduce the actual situation. By way of example, this correction may involve just the information that is output to a vehicle driver being modified. By way of example, this is advantageous when the number of lanes is not altered permanently, but rather is influenced only by temporary events (e.g. road works, traffic accident). The driver is then provided with a very up-to-date piece of information and is not misled by incorrect data. Alternatively, provision may be made for the data in the digital map to be corrected permanently and matched to the actual circumstances. By way of example, provision may be made for this when a carriageway has been physically altered on a permanent basis.

The number of lanes is determined on the basis of a method having the following additional steps: data relating to a lane width are obtained from the data relating to lane markings. Data relating to the carriageway width are obtained from the data relating to objects. By way of example, an object to the left-hand carriageway edge is registered and another object to the right-hand carriageway edge is ascertained. If both objects are at approximately the same level then it is possible to infer the carriageway width. Finally, the number of lanes on the carriageway is determined from the data relating to the carriageway width and the data relating to the lane width. In the simplest case of lanes of identical width, it is possible to divide the carriageway width by the lane width, for example, and the number of lanes is obtained directly. By also including the position found by the satellite signal and also the data from the digital map, it is possible to safely determine the number of lanes even in the case of lanes which are not of identical width. The data relating to lane markings may also comprise information about the type of lines. From a solid line, for example, it is possible to infer that it bounds the carriageway. By contrast, dashed lines indicate a further lane. This information can likewise be used to determine the lane width, or the number of lanes. Meaningful data can also be obtained for moving objects. By way of example, other vehicles and the direction of motion thereof can be detected. If the direction in which the vehicles in the lanes are travelling is known, it is likewise possible to determine the number of lanes.

A further preference is for a piece of information to be output to a vehicle driver which is based at least on the lane-precise position of the vehicle. Such a piece of information is particularly a statement about a number of lanes to be changed. The driver is thus able to be provided with very specific driving instructions, and vehicle navigation becomes simple and safe. By way of example, the driver is provided with a driving instruction about how many lane changes he needs to make in order to get to a desired exit. This is of decisive advantage particularly when the number of lanes which are actually present does not match the number of expected lanes that is stored in the digital map. Without the method that is available here, the driving instructions from the navigation system would be incorrect, would confuse the driver and would possibly cause a dangerous traffic situation.

A further preference is for at least one lane marking to be sought which is different from a carriageway edge marking. When travelling in an outer lane, it may be sufficient to detect exclusively the carriageway edge marking in order to identify the vehicle's own lane. Particularly on a carriageway with a very large number of lanes, exclusive detection of carriageway edge markings is not always sufficient to find the position of a vehicle in a lane-specific fashion and to correctly sense the number of lanes that are present. This is the case particularly when travelling in a middle lane. It is therefore of substantial advantage when lines which run in the center of a carriageway are identified.

Preferably, the digital map is used to obtain such data relating to the first vehicle environment as are contained in a group which comprises:
  statements relating to the number of lanes on a carriageway;
  statements relating to the curvature or relating to curvature values of a carriageway, particularly in the area ahead of the vehicle;
  statements relating to markings on the carriageway, particularly lane markings, lines, symbols, numbers, etc.;
  statements relating to physical particularities on the carriageway, e.g. a physical division of lanes.

These data allow particularly effective route forecast and are particularly suitable for lane-specific vehicle position finding.

Preferably, such data relating to lane markings are obtained as are contained in a group which comprises:
  statements relating to a position of a lane marking. This may be particularly a lateral or longitudinal distance between a line and the vehicle. It may also be a statement relating to the markings which enclose the vehicle (own lane);
  statements relating to a curvature of a lane marking. This is of crucial significance to the recognition of curves;
  statements relating to a length of a lane marking. The distance between lane markings is relevant to traffic law. By way of example, solid lines, in contrast to broken lines, symbolize no overtaking. The width of the lines can also be sensed if necessary;
  statements relating to a type of a lane marking. This also includes the color of a lane marking, for example.

The greater the detail in which the lane markings are sensed, the greater the information content of the associated data and the more precisely the position of the vehicle on the carriageway can be found.

Preferably, such data relating to the proper motion of the vehicle are obtained as comprise measurement data which have been recorded at different times. It is thus possible to reconstruct the dynamics of a vehicle, or the trajectory thereof over time. This again allows conclusions as to what path a vehicle has taken on a carriageway and how many lanes it has changed, in particular. This allows particularly effective comprehension of the lane in which the vehicle is currently situated, and it is also possible to ascertain the number of lanes on the carriageway if necessary.

Preferably, such data relating to objects are obtained as are contained in a group which comprises:
  statements relating to a position of an object. This may be a position which is fixed (e.g. in the case of edge development) or variable (e.g. in the case of other vehicles) in time.
  statements relating to a speed of an object. This is of interest particularly in the case of vehicles.
  statements relating to a type of an object.

The inventor also proposes an apparatus used for finding the position of a vehicle on a carriageway and comprises:
  a satellite signal sensor which provides signals for finding the position of the vehicle with a first precision;
  a digital map with data relating to a first vehicle environment for the position found with the first precision;
  a driving dynamics sensor which provides data relating to the proper motion of the vehicle; and an ambient sensor which provides data relating to objects in a third vehicle environment.

Furthermore, the apparatus comprises a line recognition sensor, which provides data relating to lane markings in a second vehicle environment, and a position finding unit, which is designed to combine the data relating to the first vehicle environment from the digital map and the data relating to the lane markings in the second vehicle environment with the data relating to the proper motion of the vehicle and/or the data relating to objects in the third vehicle environment and thus to find the position of the vehicle with at least lane-specific precision on the carriageway. The position finding unit is particularly a microcomputer or computer which is suitable for processing the provided data. It is provided particularly in an electronic navigation system or in a driver assistance device. According to the proposals, it is also possible to determine the number of lanes with such an apparatus.

An automobile according to the proposals comprises the proposed apparatus.

The preferred embodiments and advantages thereof which are presented with reference to the method apply accordingly to the apparatus and to the automobile.

Further features become evident from drawings and the description of the drawings. The features and combinations of features cited above in the description and the features and combinations of features cited in the description of figures and/or the features and combinations of features shown in the figures alone can be used not only in the respectively indicated combination but also in other combinations or on their own without parting from the scope of this document.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
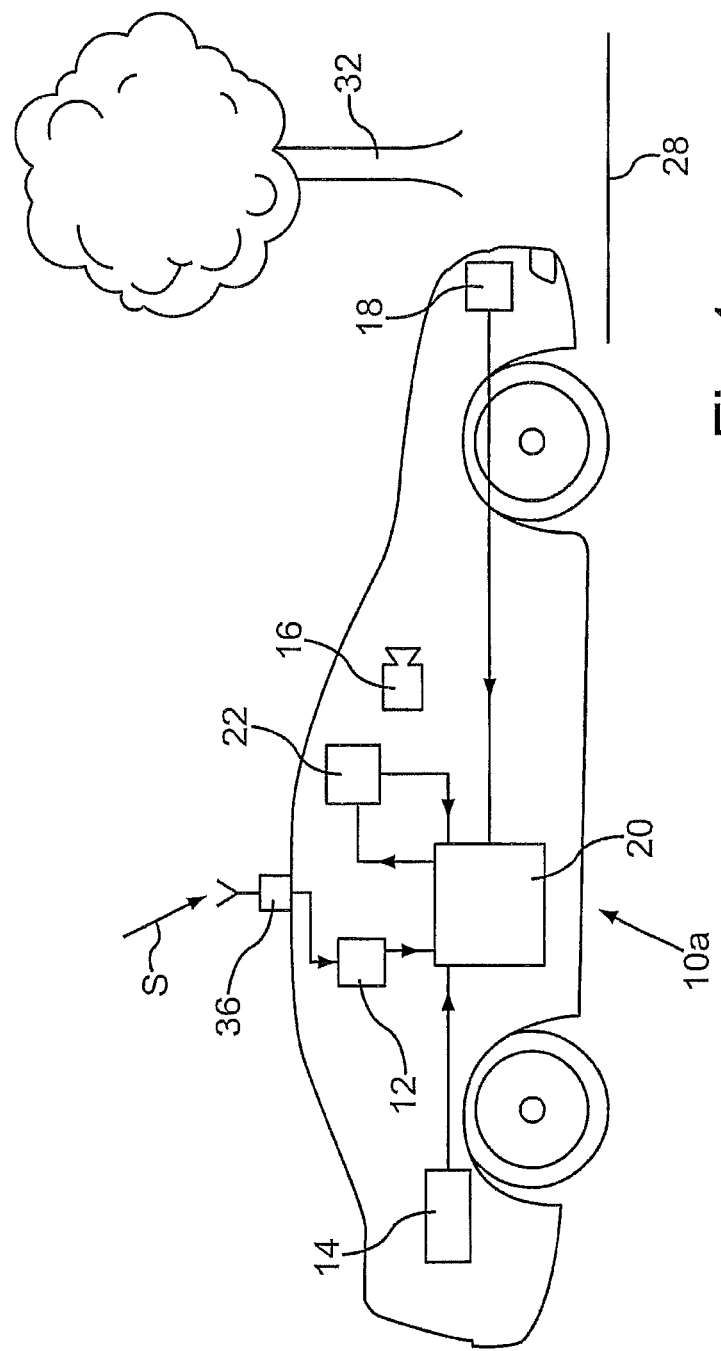
FIG. 1 shows an automobile with a schematically illustrated embodiment of the proposed apparatus.

Reference will now be made in detail to the preferred embodiments of the present invention, examples of which are illustrated in the accompanying drawings, wherein like reference numerals refer to like elements throughout.

In the figures, elements which are the same or which have the same function have been provided with the same reference symbols.

An automobile 10a is equipped with an apparatus for finding the vehicle position. The apparatus comprises a digital map 12, a driving dynamics sensor 14, an ambient sensor 16, a line recognition sensor 18, a satellite signal sensor 36 and a position finding unit 20. The satellite signal sensor 36 receives a satellite signal S via an antenna and uses this to find the position of the automobile 10a with a first precision. Data are output or signals are forwarded to the digital map 12, in which the ascertained position is brought into line with navigation map data. The digital map 12 is stored on a data memory. For the respective position, the digital map contains available map data attributes which provide information about the vehicle environment. The data are forwarded to the position finding unit 20. Alternatively, provision may also be made for the outputs from the satellite signal sensor 36 and also the data from the digital map 12 to be forwarded directly to the position finding unit 20 and to be processed therein.

The driving dynamics sensor 14 senses a proper motion of the automobile 10a and forwards the data obtained to the position finding unit 20. The line recognition sensor 18 recognizes a lane marking 28 made on a carriageway and forwards data obtained in this regard to the position finding unit 20. An object, e.g. a tree 32, is sensed and recognized by the ambient sensor 16, with the result that data relating to the tree 32 are forwarded to the position finding unit 20.

The position finding unit 20 processes at least some of the incoming data such that it determines the position of the automobile 10a at least in lane-specific fashion. In the exemplary embodiment, the number of lanes on the carriageway is also ascertained from the incoming sensor signals and navigation map data. The position finding unit 20 comprises a microcomputer which processes the incoming data by using computer software and in this way generates data which are forwarded to a navigation appliance 22. The navigation appliance 22 comprises operator control elements for interaction with a driver of the automobile 10a, a monitor for the graphically conditioned presentation of the received data and also a loudspeaker for the audible output of driving instructions.

In the exemplary embodiment, the appliances 12, 14, 16, 18, 20, 22 and 36 are shown as separate appliances. They may also be available in physically combined form, however. In particular, the position finding unit 20, the navigation appliance 22 and the digital map 12 may be combined in a common appliance having a standard housing and may be fitted in the interior of the automobile 10a, for example.

Figure 2:
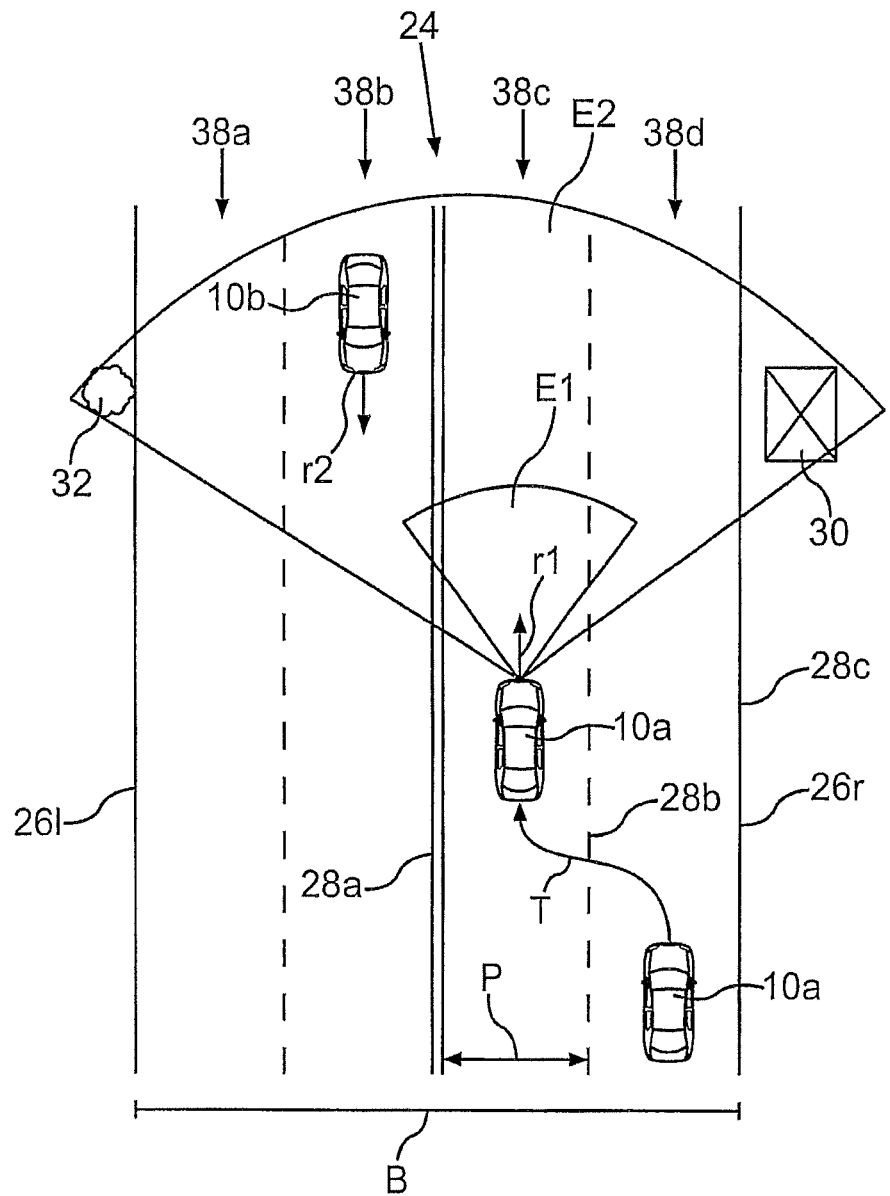
FIG. 2 shows a schematic plan view of a multilane carriageway.

FIG. 2 shows a plan view of a carriageway 24 of carriageway width B with four lanes 38a to 38d. By way of example, the lane 38c has the lane width P. The carriageway 24 is bounded by a left-hand carriageway edge 26l and a right-hand carriageway edge 26r. The carriageway 24 has a plurality of lane markings on it, e.g. the lane markings 28a (solid double line) and 28b (single broken line). The lane markings 28a and 28b bound the lane 38c to the left and to the right. The right-hand carriageway edge 26r is also marked by a lane marking 28c, which is a carriageway edge marking.

The carriageway 24 is a carriageway with right-hand traffic i.e. an automobile 10b moves in direction of travel r2 in the illustration in FIG. 2 downward in the lane 38b. An automobile 10a travels in the opposite direction of travel r1 first of all in lane 38d and at a later time in lane 38c. The automobile 10a thus changes lane according to a trajectory T in the course of its travel. In doing this, it crosses the lane marking 28b. The automobile 10b is also moving; the trajectory of this automobile is not shown, however.

In the exemplary embodiment, the line recognition sensor 18 of the automobile 10a has a sensing range E1, with the result that the lane markings 28a and 28b are detected. The line recognition sector 18 recognizes that both lane markings 28a and 28b are straight lines which are painted on the carriageway 24 in the color white. It is furthermore capable of distinguishing between the double solid line of the lane marking 28a and the single broken line of the lane marking 28b.

The line recognition sensor 18 can ascertain the lane width P of the lane 38c from the position of the lane markings 28a and 28b.

The ambient sensor 16 has a sensing range E2 which is different from the sensing range E1. The sensing ranges E1 and E2 cover a second and a third vehicle environment. The sensing range E2 contains the tree 32, the automobile 10b and a house 30, which are able to be detected as objects by the ambient sensor 16. The ambient sensor 16 classifies the tree 32 as an object which is typically present at a carriageway edge. The house 30 is also classified as typical edge development. The objects 32 and 30 therefore allow the ambient sensor 16 to identify the left-hand carriageway edge 26l and the right-hand carriageway edge 26r and hence to ascertain the carriageway width B. The ambient sensor 16 can use image processing to identify the automobile 10b as such and to recognize its direction of travel r2.

The driving dynamics sensor 14 measures the speed of travel and the lateral acceleration of the automobile 10a and can take this information as a basis for reconstructing the trajectory T. It is therefore recognized that a lane change from the lane 38d to the lane 38c has taken place.

The data obtained in this manner about the lane markings 28a and 28b, the objects 32, 30 and 10b and about the trajectory T are forwarded to the position finding unit 20, where they are combined with the navigation data from the digital map 12 and with the position data from the satellite signal sensor 36 and are processed. The position of the automobile 10a can be found on the carriageway 24 with lane precision, and the number of lanes is also ascertained.

The vehicle driver can then be provided with the information on the navigation appliance 22 that the carriageway 24 has a total of four lanes, that his automobile 10a is currently in the lane 38c, that he is in the left-hand lane of the two lanes in the direction of travel, that to his left there are two lanes 38a and 38b with oncoming traffic, that the lane marking 28a to his left symbolizes that this lane must not be used, and that he was previously in a lane which is at the right-hand carriageway edge 26r. If the automobile 10a crosses the lane marking 28a in the further course of travel, the navigation appliance 22 is used to output a warning to the vehicle driver.

Figure 3A:
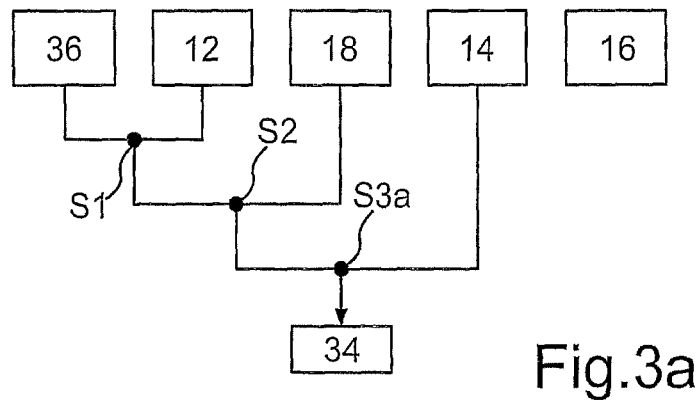
FIG. 3a shows a flowchart for the proposed method based on a first exemplary embodiment.
Figure 3B:
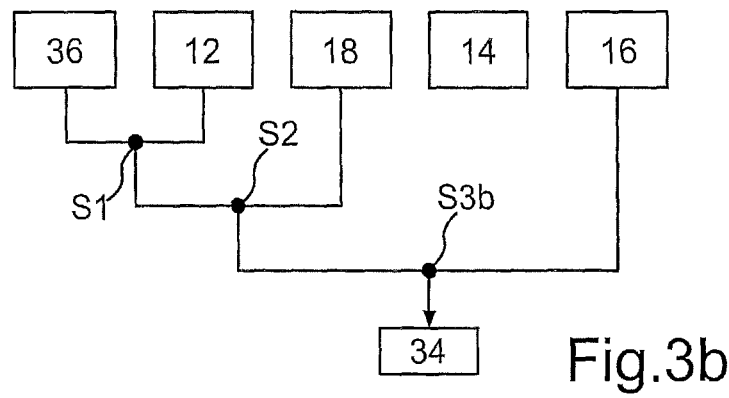
FIG. 3b shows a flowchart for the method based on a second exemplary embodiment.
Figure 3C:
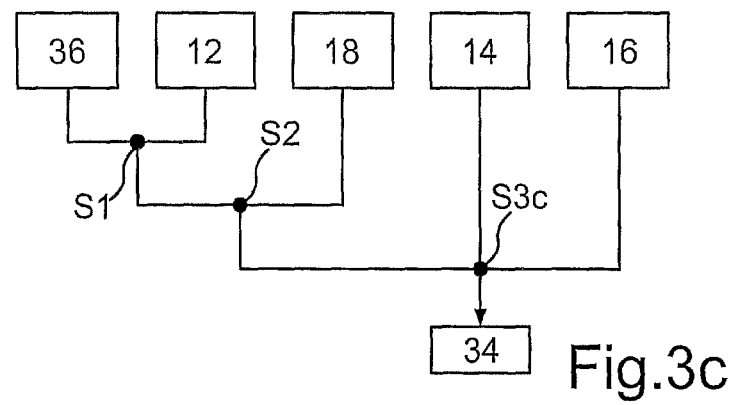
FIG. 3c shows a flowchart for the method based on a third exemplary embodiment.

Three possible exemplary embodiments of the proposed method are shown in FIGS. 3a to 3c. According to the first exemplary embodiment in FIG. 3a, step S1 involves data relating to the position of the automobile 10a which have been obtained by the satellite signal sensor 36 being combined with data from the digital map 12 such that data relating to a first vehicle environment are output. These data are combined in a step S2 with data relating to lane markings which are provided by the line recognition sensor 18. The data obtained in this manner are again combined (step S3a) with data relating to proper motion of the automobile 10a (provided by the driving dynamics sensor 14), with the result that the data obtained reproduce the lane-specific position of the automobile 10a. These data are then provided for the vehicle driver on an output unit 34 in graphically and/or audibly conditioned form. The output unit 34 is particularly part of the navigation appliance 22.

In the exemplary embodiment in FIG. 3b, on the other hand, the data provided by the driving dynamics sensor 14 relating to the proper motion of the automobile 10a are ignored, and instead step S3b involves combination with the data which are delivered by the ambient sensor 16 for the objects in the sensing range E2.

In the exemplary embodiment in FIG. 3c, both the data provided by the driving dynamics sensor 14 and the data delivered by the ambient sensor 16 are in turn combined with the data resulting from step S2 in a step S3c such that the position of the automobile 10a is ascertained in lane-specific fashion.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for finding a position of an automotive vehicle on a carriageway, comprising:
    finding the position of the vehicle with a first precision using outputs from a satellite signal sensor;
    obtaining data relating to a first vehicle environment for the position found with the first precision, from a digital map;
    obtaining data relating to lane markings in a second vehicle environment, with a line recognition sensor;
    obtaining data relating to proper motion of the vehicle, with a driving dynamics sensor;
    obtaining data relating to objects in a third vehicle environment, with an ambient sensor, the data relating to objects pertaining to a current carriageway situation;
    finding the position of the vehicle with at least lane-specific precision on the carriageway, by combining:
        the data relating to the first vehicle environment, obtained from the digital map and
        the data relating to lane markings in the second vehicle environment with
        the data relating to proper motion of the vehicle and
        the data relating to objects in the third vehicle environment;
    obtaining data relating to a lane width, from the data relating to lane markings;
    obtaining data relating to a carriageway width from the data relating to objects; and
    determining and outputting information regarding current number of lanes on the carriageway, from the data relating to the lane width and the data relating to the carriageway width.

2. The method according to claim 1, wherein the information regarding current number of lanes is used to correct data in the digital map.

3. The method according to claim 2, further comprising:
    outputting directions to a vehicle driver regarding a number of lanes to be changed, the directions being based on a vehicle position determined with at least lane-specific precision.

4. The method according to claim 3, wherein the data relating to lane markings comprises at least one lane marking different from a carriageway edge marking.

5. The method according to claim 4, wherein the data relating to the first vehicle environment, obtained from the digital map, comprises at least one of information regarding a current number of lanes, information regarding a curvature of the carriageway, information relating to markings on the carriageway, and information relating to physical particularities on the carriageway.

6. The method according to claim 5, wherein the data relating to lane markings comprises at least one of information relating to position of lane markings, information relating to a type of lane markings, information relating to a curvature of lane markings and information relating to a length of lane markings.

7. The method according to claim 6, wherein the data relating to proper motion of the vehicle comprise measurement data recorded at different times.

8. The method according to claim 7, wherein the data relating to proper motion of the vehicle includes information regarding current lateral acceleration of the vehicle and information regarding current speed of travel.

9. The method according to claim 8, wherein the data relating to objects comprise at least one of information relating to object position, information relating to object speed and information relating to object type.

10. The method according to claim 1, further comprising: outputting driving directions to a vehicle driver with at least lane-specific precision position of the vehicle.

11. The method according to claim 1, further comprising: outputting directions to a vehicle driver regarding a number of lanes to be changed, the directions being based on a vehicle position determined with at least lane-specific precision.

12. The method according to claim 1, wherein the data relating to lane markings comprises at least one lane marking different from a carriageway edge marking.

13. The method according to claim 1, wherein the data relating to the first vehicle environment, obtained from the digital map, comprises at least one of information regarding a current number of lanes, information regarding a curvature of the carriageway, information relating to markings on the carriageway, and information relating to physical particularities on the carriageway.

14. The method according to claim 1, wherein the data relating to lane markings comprises at least one of information relating to position of lane markings, information relating to a type of lane markings, information relating to a curvature of lane markings and information relating to a length of lane markings.

15. The method according to claim 1, wherein the data relating to proper motion of the vehicle comprise measurement data recorded at different times.

16. The method according to claim 1, wherein the data relating to proper motion of the vehicle includes information regarding current lateral acceleration of the vehicle and information regarding current speed of travel.

17. The method according to claim 1, wherein the data relating to objects comprise at least one of information relating to object position, information relating to object speed and information relating to object type.

18. The method according to claim 1, wherein the data relating to the first vehicle environment, the data relating to lane markings, the data relating to proper motion of the vehicle and the data relating to objects are obtained independently of one another.

19. An apparatus to find a position of an automotive vehicle on a carriageway, comprising:
a satellite signal sensor to provide signals for finding the position of the vehicle with a first precision;
a digital map with data relating to a first vehicle environment for the position of the vehicle found with the first precision;
a line recognition sensor to provide data relating to lane markings in a second vehicle environment;
a driving dynamics sensor to provide data relating to proper motion of the vehicle;
an ambient sensor to provide data relating to objects in a third vehicle environment;
a position finding unit to find the position of the vehicle with at least lane-specific precision on the carriageway, the position finding unit combining the data relating to the first vehicle environment obtained from the digital map, the data relating to the lane markings in the second vehicle environment, the data relating to proper motion of the vehicle and the data relating to objects in the third vehicle environment; and
an apparatus to obtain data relating to a lane width from the data relating to lane markings, to obtain data relating to a carriageway width from the data relating to objects, and to determine and output information regarding current number of lanes on the carriageway, from the data relating to the lane width and the data relating to the carriageway width.

20. An automobile comprising:
an apparatus to find a position of an automotive vehicle on a carriageway, the comprising:
a satellite signal sensor to provide signals for finding the position of the vehicle with a first precision;
a digital map with data relating to a first vehicle environment for the position of the vehicle found with the first precision;
a line recognition sensor to provide data relating to lane markings in a second vehicle environment;
a driving dynamics sensor to provide data relating to proper motion of the vehicle;
an ambient sensor to provide data relating to objects in a third vehicle environment;
a position finding unit to find the position of the vehicle with at least lane-specific precision on the carriageway, the position finding unit combining the data relating to the first vehicle environment obtained from the digital map, the data relating to the lane markings in the second vehicle environment, the data relating to proper motion of the vehicle and the data relating to objects in the third vehicle environment; and
an apparatus to obtain data relating to a lane width from the data relating to lane markings, to obtain data relating to a carriageway width from the data relating to objects, and to determine and output information regarding current number of lanes on the carriageway, from the data relating to the lane width and the data relating to the carriageway width.

* * * * *